(12) United States Patent
Reyes

(10) Patent No.: US 9,521,919 B1
(45) Date of Patent: Dec. 20, 2016

(54) SELF-STABILIZING ARTICLE HOLDER

(71) Applicant: Yvette Reyes, Cutler Bay, FL (US)

(72) Inventor: Yvette Reyes, Cutler Bay, FL (US)

( * ) Notice: Subject to any disclaimer, the term of this patent is extended or adjusted under 35 U.S.C. 154(b) by 0 days.

(21) Appl. No.: 15/139,078

(22) Filed: Apr. 26, 2016

(51) Int. Cl.
*A47G 23/02* (2006.01)
*A47G 29/093* (2006.01)
*B65D 25/24* (2006.01)
*F16M 13/02* (2006.01)
*F16B 47/00* (2006.01)
*A45F 5/00* (2006.01)
*A47G 19/22* (2006.01)

(52) U.S. Cl.
CPC ............ *A47G 23/0225* (2013.01); *A45F 5/00* (2013.01); *A47G 19/2255* (2013.01); *A47G 29/093* (2013.01); *B65D 25/24* (2013.01); *F16B 47/00* (2013.01); *F16M 13/022* (2013.01); *A45F 2200/0583* (2013.01); *B65D 2313/06* (2013.01)

(58) Field of Classification Search
CPC ............ A47G 19/2255; A47G 19/2261; A47G 23/0225; A47G 23/03; A47G 29/093; B65D 23/001; B65D 25/24; B65D 2313/06; F16B 47/00; A45F 5/00; A45F 2200/0583; F16M 13/022
USPC ................... 248/205.5, 205.6, 205.7, 205.8, 205.9,248/206.1, 206.2, 206.3, 206.4, 346.03, 346.04,248/346.11, 362, 363, 309.3, 310, 311.2, 154,248/683; 220/630, 632, 633, 634, 635, 636, 220/638, 647, 729, 737, 739, 483; 224/559, 224/926; D7/624.1
See application file for complete search history.

(56) References Cited

U.S. PATENT DOCUMENTS

| | | | | | |
|---|---|---|---|---|---|
| 2,057,972 | A | * | 10/1936 | Pieck | A47G 19/26 206/216 |
| 2,839,260 | A | * | 6/1958 | Jacobi, Jr. | A47G 23/0225 248/146 |
| 3,107,028 | A | * | 10/1963 | De Robertis | A47G 23/0216 215/395 |
| 4,315,382 | A | * | 2/1982 | Kay | A01G 9/042 47/71 |
| 4,756,497 | A | * | 7/1988 | Lan | F16B 47/00 220/630 |
| 4,760,987 | A | * | 8/1988 | Lan | A47K 1/09 248/346.11 |
| 4,941,635 | A | * | 7/1990 | Lan | A47K 1/09 248/205.9 |
| 5,481,826 | A | * | 1/1996 | Dickinson | A01G 9/04 47/39 |
| 5,511,752 | A | * | 4/1996 | Trethewey | F16B 47/00 248/205.8 |
| 6,000,575 | A | | 12/1999 | LaCour et al. | |

(Continued)

*Primary Examiner* — Jonathan Liu
*Assistant Examiner* — Guang H Guan
(74) *Attorney, Agent, or Firm* — Stevenson IP, LLC

(57) ABSTRACT

A self-stabilizing article holder devised to stabilize a container, such as a drink glass, in an upright position to prevent spillage of a substance therefrom. The article holder includes a suction cup base configured to adhere to a mounting surface to maintain the container in an upright position. The container has an annular connection wall on a bottom side thereof that fits inside and against an annular lip on an outer perimeter of an upper surface of the base. An aperture centrally disposed in the base is configured to removably receive a stabilizer member disposed on the container bottom side. A pair of receiver members disposed on the base upper surface is configured to securingly receive respective upper connectors disposed on the container bottom side therein. A spring that surrounds the stabilizer member between the base and the container secures the receiver members and upper connectors together.

2 Claims, 4 Drawing Sheets

(56) References Cited

U.S. PATENT DOCUMENTS

| | | | | |
|---|---|---|---|---|
| 6,267,340 B1* | 7/2001 | Wang | ............... | B60R 11/00 |
| | | | | 224/542 |
| 6,439,418 B1* | 8/2002 | Immerman | ............ | B65D 25/24 |
| | | | | 220/626 |
| 6,491,265 B2* | 12/2002 | Tracy | ............... | E05C 19/06 |
| | | | | 248/131 |
| 6,497,394 B1 | 12/2002 | Dunchock | | |
| 6,511,031 B2* | 1/2003 | Lin | ............... | A47G 19/2261 |
| | | | | 220/719 |
| 6,571,976 B1 | 6/2003 | Sonnabend | | |
| 6,604,648 B2* | 8/2003 | Immerman | ........ | A47G 19/2255 |
| | | | | 220/630 |
| 7,481,329 B2* | 1/2009 | Camp, Jr. | .......... | B65F 1/06 |
| | | | | 220/720 |
| 8,028,850 B2* | 10/2011 | Zimmerman | ...... | A47G 19/2261 |
| | | | | 220/23.86 |
| 8,757,418 B2* | 6/2014 | Zimmerman | ............ | A47G 7/06 |
| | | | | 220/483 |
| 2007/0012706 A1* | 1/2007 | Deadman | ........... | B65D 81/3879 |
| | | | | 220/737 |

\* cited by examiner

SELF-STABILIZING ARTICLE HOLDER

BACKGROUND OF THE INVENTION

Various types of suction cup mounted holders are known in the prior art. However, what is needed is a self-stabilizing article holder devised to stabilize a container, such as a drink glass in an upright position to prevent spillage of a substance, such as a beverage, therefrom.

FIELD OF THE INVENTION

The present invention relates to suction cup mounted holders, and more particularly, to a self-stabilizing article holder base.

SUMMARY OF THE INVENTION

The general purpose of the present self-stabilizing article holder, described subsequently in greater detail, is to provide a self-stabilizing article holder which has many novel features that result in a self-stabilizing article holder which is not anticipated, rendered obvious, suggested, or even implied by prior art, either alone or in combination thereof.

To accomplish this, the present self-stabilizing article holder includes a frustoconical suction cup base configured to adhere to a mounting surface to maintain a container in an upright position. A raised annular lip is continuously disposed on an outer perimeter of an upper surface of the base. An inverted frustoconical-formed aperture is centrally disposed in the base. A pair of diametrically opposed hollow cylindrical receiver members is disposed on the upper surface on opposite sides of the aperture. Each receiver member has an inwardly angled inner top edge. A first groove is disposed between one of the receiver members and the aperture.

The container, which is removably attached to the base upper surface, includes an upper containment portion having a closed bottom side and an annular connection wall extending from the bottom side. The annular connection wall is removably connected to the base upper surface in a position fitted inside and against the raised annular lip. A frustoconical stabilizer member is centrally disposed on the bottom side of the upper containment portion in an inverted position. The aperture is configured to removably receive the stabilizer member therein to permit the release of air pressure from the base as the stabilizer member is inserted into the aperture thereby creating a partial vacuum to permit the base to adhere to the mounting surface.

A pair of diametrically opposed upper connectors is disposed on the bottom side on opposite sides of the stabilizer member. Each upper connector includes a cylindrical foot attached to the bottom side and a hollow cylindrical connect portion disposed thereon. A pair of diametrically opposed inverted V-shaped cutouts is disposed in an exterior wall of the connect portion. Each receiver member is configured to removably receive one of the upper connectors therein. A helical spring, which is disposed between the base upper surface and the bottom side of the container in a position surrounding the stabilizer member, has a pair of outer ends that engage one of the first groove and a second groove disposed on the bottom side of the upper containment portion in a vertically aligned position with the first groove. Upon compression of the spring, the upper connectors are secured in place within the receiver members.

Thus has been broadly outlined the more important features of the present self-stabilizing article holder so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
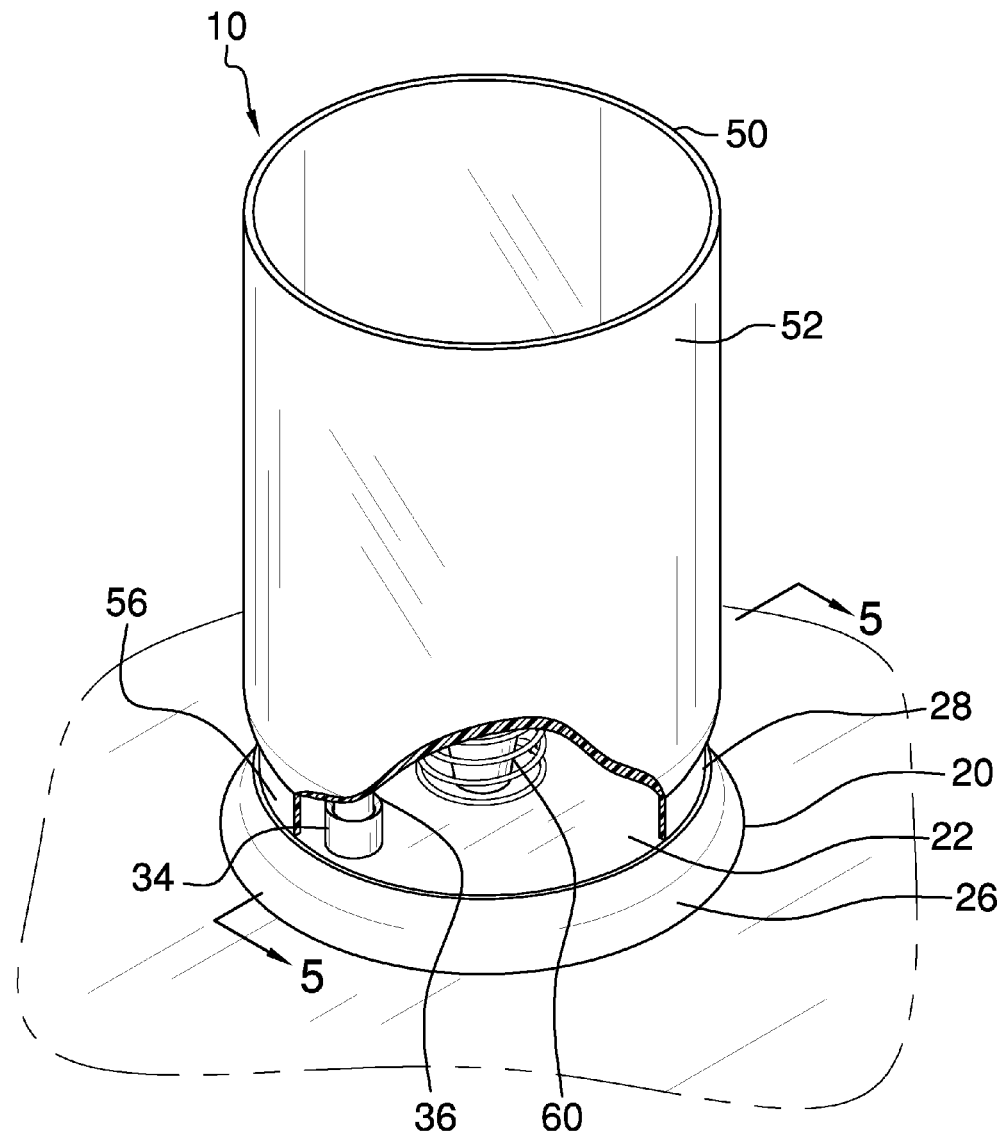
FIG. 1 is an in-use isometric view with a partial cutaway showing a container attached to a suction cup base.
Figure 2:
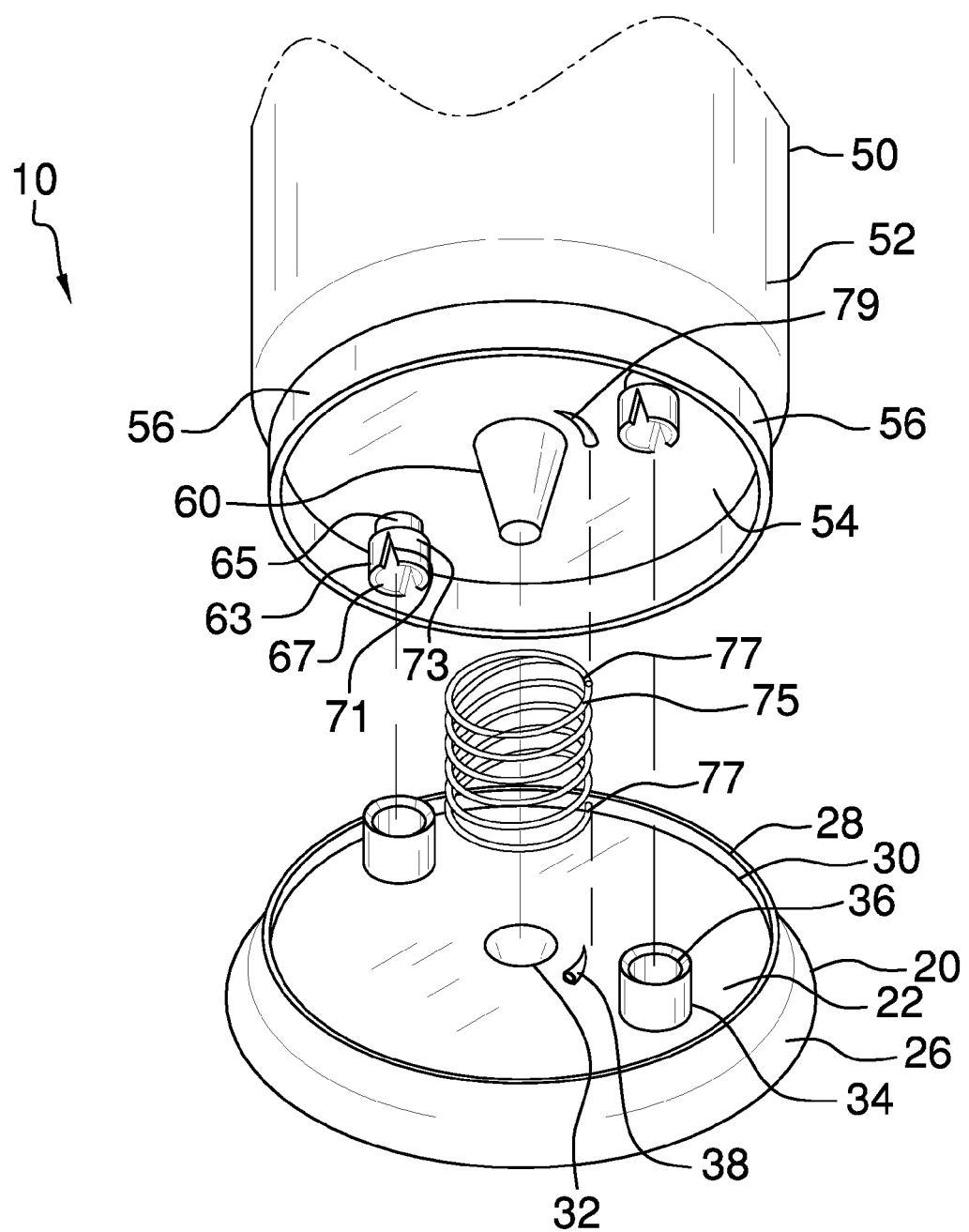
FIG. 2 is an exploded view.
Figure 3:
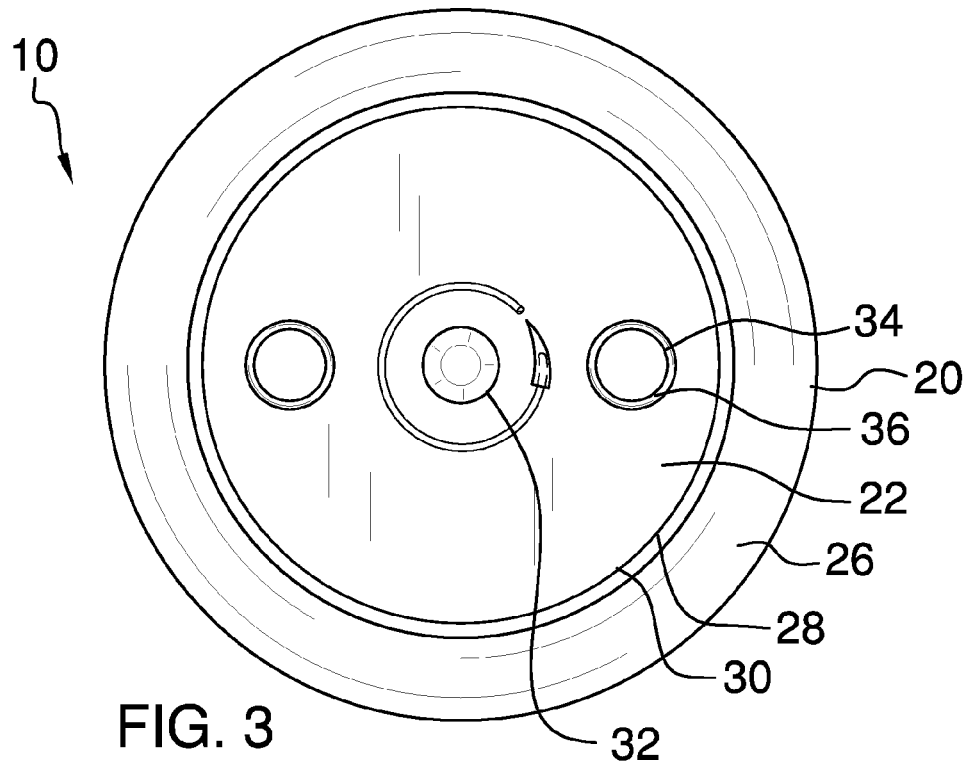
FIG. 3 is a top view of the base.
Figure 4:
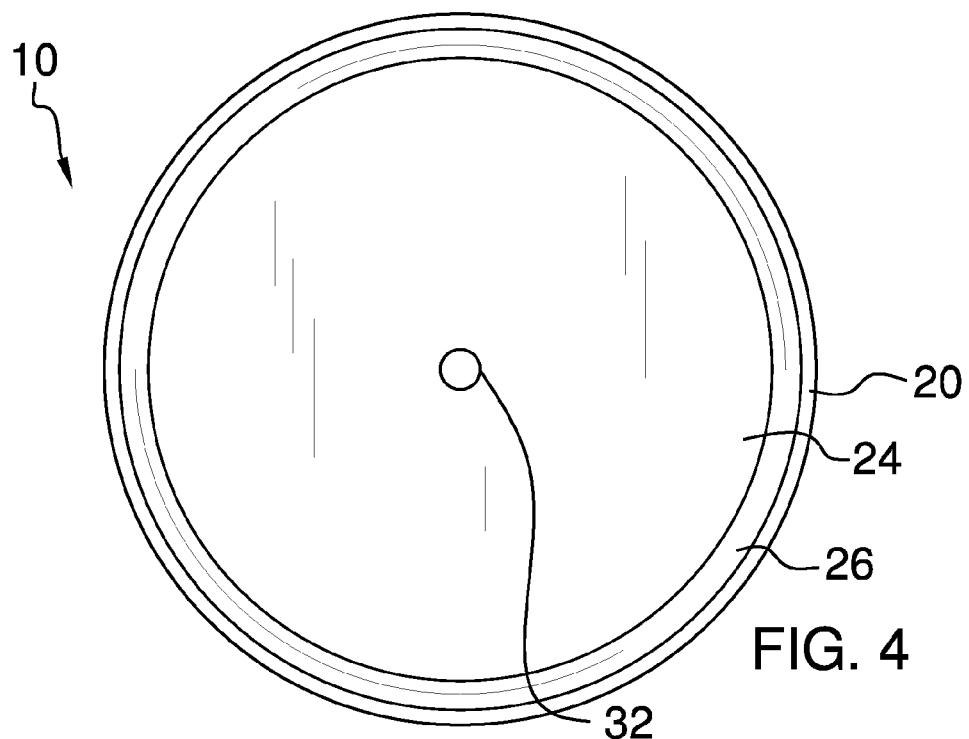
FIG. 4 is a bottom plan view.
Figure 5:
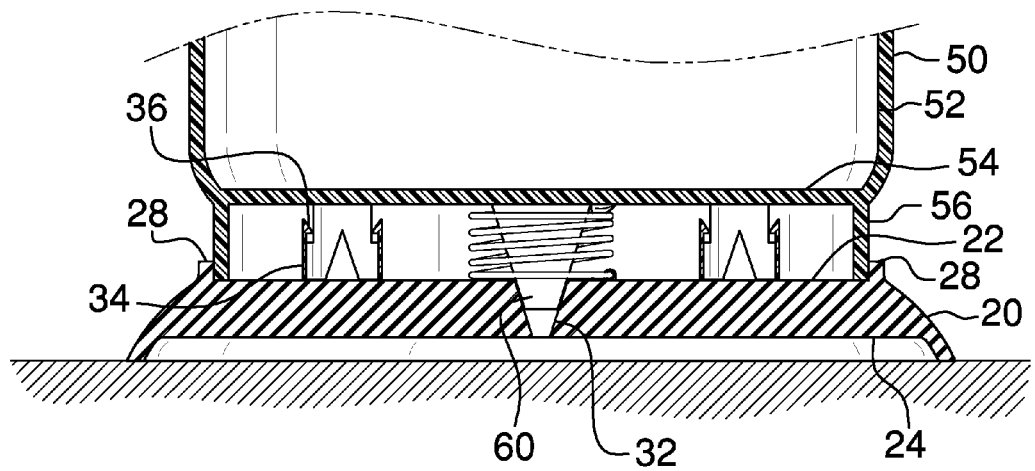
FIG. 5 is a cross-sectional view taken along line 5-5 of FIG. 1.
Figure 6:
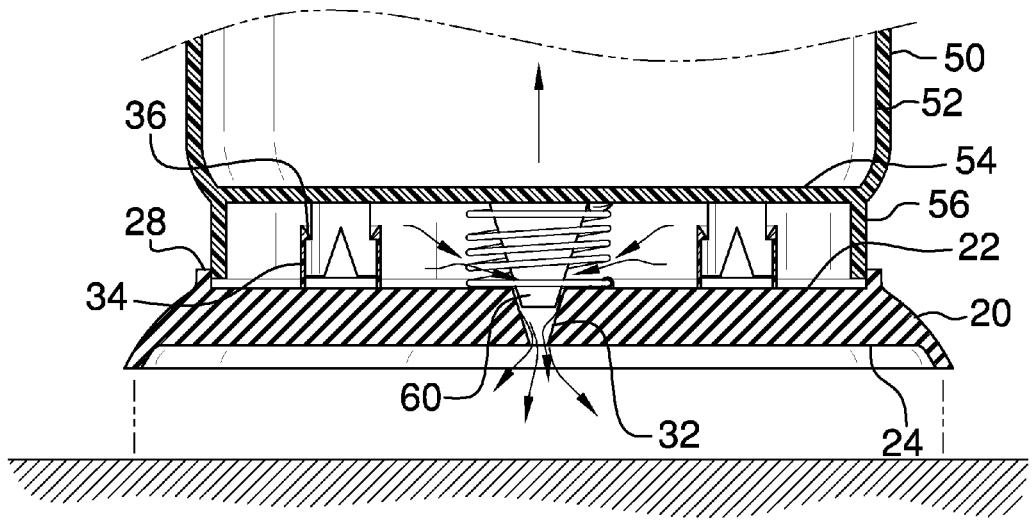
FIG. 6 is a cross-sectional view as shown in FIG. 5 showing air flow through the base.

With reference now to the drawings, and in particular FIGS. 1 through 6 thereof, an example of the instant self-stabilizing article holder employing the principles and concepts of the present self-stabilizing article holder and generally designated by the reference number 10 will be described.

Referring to FIGS. 1 through 6 the present self-stabilizing article holder 10 is illustrated. The self-stabilizing article holder 10 includes a frustoconical suction cup base 20 configured to adhere to a mounting surface to maintain a container 50 in an upright position. The base 20 includes an upper surface 22, a lower surface 24 opposite the upper surface 22, and a continuous outer surface 26 disposed between the upper surface 22 and the lower surface 24. A raised annular lip 28 is continuously disposed on an outer perimeter 30 of the upper surface 22. An inverted frustoconical-formed aperture 32 is centrally disposed in the base 20. In addition, a pair of diametrically opposed hollow cylindrical receiver members 34 is disposed on the upper surface 22 proximal the lip 28. The receiver members 34 are disposed on opposite sides of the aperture 32. Each receiver member 34 has an inwardly angled inner top edge 36. A first groove 38 is disposed between one of the receiver members 34 and the aperture 32.

The container 50 is removably attached to the base 20 upper surface 22. The container 50 includes an upper containment portion 52 having a closed bottom side 54 and an annular connection wall 56 extending from the bottom side 54. The annular connection wall 56 is removably connected to the base 20 upper surface 22 in a position fitted inside and against the raised annular lip 28. A frustoconical stabilizer member 60 is centrally disposed on the bottom side 54 of the upper containment portion 52 in an inverted position. The aperture 32 is configured to removably receive the stabilizer member 60 therein. The aperture 32 permits the release of air pressure from the base 20 as the stabilizer member 60 is inserted into the aperture 32 thereby creating a partial vacuum to permit the base 20 to adhere to the mounting surface.

A pair of diametrically opposed upper connectors 63 is disposed on the bottom side 54 proximal an external perimeter of the bottom side 54. The upper connectors 63 are disposed on opposite sides of the stabilizer member 60. Each upper connector 63 includes a cylindrical foot 65 attached to the bottom side 54. A hollow cylindrical connect portion 67 is disposed on the foot 65. A pair of diametrically opposed inverted V-shaped cutouts 71 is disposed in an exterior wall 73 of the connect portion 67. Each receiver member 34 is configured to removably receive one of the upper connectors 63 therein. A helical spring 75 is disposed between the base 20 upper surface 22 and the bottom side 54 of the container 50 in a position surrounding the stabilizer member 60. The spring 75 has a pair of outer ends 77. A second groove 79 is disposed on the bottom side 54 of the upper containment portion 52 in a vertically aligned position with the first groove 38. Each outer end 77 of the spring 75 engages a respective one of the first groove 38 and the second groove 79 to secure the spring in place around the stabilizer member 60. Upon compression of the spring 75, the upper connectors 63 are secured in place within the receiver members 34.

What is claimed is:

1. A self-stabilizing article holder comprising:
  a frustoconical suction cup base comprising:
    an upper surface;
    a lower surface opposite the upper surface;
    a continuous outer surface disposed between the upper surface and the lower surface;
    a raised annular lip continuously disposed on an outer perimeter of the upper surface;
    an aperture centrally disposed in the base;
    a pair of diametrically opposed hollow receiver members disposed on the upper surface, the receiver members disposed on opposite sides of the aperture, each receiver member having an inwardly angled inner top edge;
    a first groove disposed between one of the receiver members and the aperture;
  a hollow cylindrical container removably attached to the upper surface of the base, the container comprising:
    an upper containment portion having a closed bottom side;
    an annular connection wall extending from the bottom side, the connection wall removably attached to the upper surface of the base in a position fitted inside and against the lip;
    a stabilizer member centrally disposed on the bottom side of the upper containment portion;
    a second groove disposed on the bottom side of the upper containment portion in a vertically aligned position with the first groove;
    a pair of diametrically opposed upper connectors disposed on the bottom side proximal an external perimeter of the bottom side, the upper connectors disposed on opposite sides of the stabilizer member, each upper connector comprising:
      a foot attached to the bottom side;
      a hollow connect portion disposed on the foot; and
      a pair of diametrically opposed inverted V-shaped cutouts in an exterior wall of the connect portion;
  a helical spring disposed between the upper surface of the base and the bottom side of the container in a position surrounding the stabilizer member, the spring having a pair of outer ends, each outer end of the spring engaging a respective one of the first groove and the second groove;
  wherein the aperture is configured to removably receive the stabilizer member therein, wherein upon receipt of the stabilizer member therein, the aperture is configured to release air pressure from the base, wherein upon release of air pressure from the base, the base is configured to adhere to a mounting surface;
  wherein each receiver member is configured to removably receive one of the upper connectors therein.

2. A self-stabilizing article holder comprising:
  a frustoconical suction cup base comprising:
    an upper surface;
    a lower surface opposite the upper surface;
    a continuous outer surface disposed between the upper surface and the lower surface;
    a raised annular lip continuously disposed on an outer perimeter of the upper surface;
    an inverted frustoconical-formed aperture centrally disposed in the base;
    a pair of diametrically opposed hollow cylindrical receiver members disposed on the upper surface proximal the lip, the receiver members disposed on opposite sides of the aperture, each receiver member having an inwardly angled inner top edge;
    a first groove disposed between one of the receiver members and the aperture;
  a hollow cylindrical container removably attached to the upper surface of the base, the container comprising:
    an upper containment portion having a closed bottom side;
    an annular connection wall extending from the bottom side, the connection wall removably attached to the upper surface of the base in a position fitted inside and against the lip;
    a frustoconical stabilizer member centrally disposed on the bottom side of the upper containment portion in an inverted position;
    a second groove disposed on the bottom side of the upper containment portion in a vertically aligned position with the first groove;
    a pair of diametrically opposed upper connectors disposed on the bottom side proximal an external perimeter of the bottom side, the upper connectors disposed on opposite sides of the stabilizer member, each upper connector comprising:
      a cylindrical foot attached to the bottom side;
      a hollow cylindrical connect portion disposed on the foot; and
      a pair of diametrically opposed inverted V-shaped cutouts in an exterior wall of the connect portion;
  a helical compression spring disposed between the upper surface of the base and the bottom side of the container in a position surrounding the stabilizer member, the spring having a pair of outer ends, each outer end of the spring engaging a respective one of the first groove and the second groove;
  wherein the aperture is configured to removably receive the stabilizer member therein, wherein upon receipt of the stabilizer member therein, the aperture is configured to release air pressure from the base, wherein upon release of air pressure from the base, the base is configured to adhere to a mounting surface;
  wherein each receiver member is configured to removably receive one of the upper connectors therein.

* * * * *